United States Patent
Terakawa et al.

(10) Patent No.: US 11,574,651 B2
(45) Date of Patent: *Feb. 7, 2023

(54) MAGNETIC RECORDING MEDIUM HAVING -IRON OXIDE-CONTAINING PARTICLES

(71) Applicant: Sony Corporation, Tokyo (JP)

(72) Inventors: Masaru Terakawa, Miyagi (JP); Yoichi Kanemaki, Miyagi (JP); Minoru Yamaga, Miyagi (JP)

(73) Assignee: Sony Corporation, Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 16/477,687

(22) PCT Filed: Dec. 28, 2017

(86) PCT No.: PCT/JP2017/047257
§ 371 (c)(1),
(2) Date: Jul. 12, 2019

(87) PCT Pub. No.: WO2018/131507
PCT Pub. Date: Jul. 19, 2018

(65) Prior Publication Data
US 2019/0362753 A1 Nov. 28, 2019

(30) Foreign Application Priority Data
Jan. 13, 2017 (JP) .............................. JP2017-004695

(51) Int. Cl.
*G11B 5/706* (2006.01)
*G11B 5/712* (2006.01)
*G11B 5/714* (2006.01)

(52) U.S. Cl.
CPC .......... *G11B 5/70642* (2013.01); *G11B 5/712* (2013.01); *G11B 5/714* (2013.01)

(58) Field of Classification Search
CPC . G11B 5/706; G11B 5/70642; G11B 5/70647; G11B 5/712; G11B 5/714
See application file for complete search history.

(56) References Cited

U.S. PATENT DOCUMENTS

| | | | |
|---|---|---|---|
| 2009/0109579 A1 | 4/2009 | Takahoshi et al. | |
| 2012/0183811 A1* | 7/2012 | Hattori | G11B 5/7085 |
| | | | 428/836 |

(Continued)

FOREIGN PATENT DOCUMENTS

| | | |
|---|---|---|
| JP | 2009-110606 A | 5/2009 |
| JP | 4687136 B2 | 5/2011 |

(Continued)

OTHER PUBLICATIONS

International Search Report and Written Opinion issued in connection with International Patent Application No. PCT/JP2017/047257, dated Mar. 13, 2018. (9 pages).

(Continued)

*Primary Examiner* — Holly Rickman
*Assistant Examiner* — Linda N Chau
(74) *Attorney, Agent, or Firm* — K&L Gates LLP (57) ABSTRACT

A magnetic recording medium, which is used in a recording and playback device in which the shortest recording wavelength is 75 nm or less, in which the magnetic recording medium has a recording layer including powder of ε-iron oxide-containing particles, the average particle size of the particles is 22 nm or less, the coercive force He is 220 kA/m or more and 320 kA/m or less, and the non linear transition shift is 20% or less.

9 Claims, 4 Drawing Sheets

(56) References Cited

U.S. PATENT DOCUMENTS

2014/0219069 A1    8/2014   Hattori et al.
2015/0111066 A1    4/2015   Terakawa et al.

FOREIGN PATENT DOCUMENTS

| JP | 5013505 B2 | 8/2012 |
| JP | 2014-149886 A | 8/2014 |
| JP | 2014-154178 A | 8/2014 |
| JP | 2015-082329 A | 4/2015 |
| WO | 2016/092744 A1 | 6/2016 |

OTHER PUBLICATIONS

29.5-GB/in2 Recording Areal Density on Barium Ferrite Tape, IEEE Transactions on Magnetics, vol. 47, No. 1, Jan. 2011, pp. 137-147. (1 pages).

* cited by examiner

MAGNETIC RECORDING MEDIUM HAVING -IRON OXIDE-CONTAINING PARTICLES

CROSS-REFERENCE TO RELATED APPLICATIONS

The present application claims the benefit of International Application No. PCT/JP2017/047257, filed Dec. 28, 2017, which claims priority to Japanese Application No. 2017-004695, filed Jan. 1, 2017, the disclosures of which are incorporated herein by reference.

TECHNICAL FIELD BACKGROUND

The present technology relates to a magnetic recording medium.

In recent years a demand to increase the recording density of magnetic recording media as media for data storage has been raised because of, for example, the development of information technology (IT) society, electronification in e.g. libraries and archives, long-term storage of business documents, and the like.

In order to meet the demand, hexagonal barium ferrite magnetic powder has been used in place of needle-shaped magnetic powder in a recent linear tape open (LTO) 6-capable magnetic recording medium. A road map for increasing the recording density, which will make a transition from a longitudinal recording system using needle-shaped magnetic powder to a perpendicular recording system using barium ferrite magnetic powder in the future, is drawn (see e.g. Non patent document 1). As magnetic powder for achieving an increase in recording density, for example, a technique using cubic CoMn-based spinel ferrite magnetic powder (see e.g. Patent Document 1), a technique using $\varepsilon Fe_2O_3$ magnetic powder (see e.g. Patent document 2), and the like have been reported in addition to the above barium ferrite magnetic powder.

SUMMARY OF THE INVENTION SUMMARY

Problems to be Solved by the Invention

In a prospective magnetic recording medium with a high recording density, it becomes important that a good signal-noise ratio (SNR) can be obtained and non linear transition shift (NLTS) is inhibited.

An object of the present technology is to provide a magnetic recording medium, in which a good SNR can be obtained and NLTS can be inhibited.

Solutions to Problems

In order to solve the above-described problems, the present technology is a magnetic recording medium, which is used in a recording and playback device in which the shortest recording wavelength is 75 nm or less, in which the magnetic recording medium has a recording layer including powder of ε-iron oxide-containing particles, the average particle size of the particles is 22 nm or less, the coercive force He is 220 kA/m or more and 320 kA/m or less, and the non linear transition shift is 20% or less.

Effects of the Invention

According to the present technology, it is possible to achieve a magnetic recording medium, in which a good SNR can be obtained and NLTS can be inhibited.

DETAILED DESCRIPTION

An embodiment of the present technology will be illustrated in the following order.

Configuration of magnetic recording medium
Method for producing magnetic recording medium
Effects
Modified examples

[Configuration of Magnetic Recording Medium]

The magnetic recording medium according to one embodiment of the present technology is a perpendicular magnetic recording medium (a magnetic recording medium of the perpendicular magnetic recording system) configured to be able to record signals at a shortest recording wavelength of 75 nm or less, and more particularly a perpendicular magnetic recording medium, which is used in a recording and playback device in which the shortest recording wavelength is 75 nm or less. The above recording and playback device includes a ring head as a recording head, and records signals on a magnetic recording medium at a shortest recording wavelength of 75 nm or less by the ring head. In addition, the magnetic recording medium has a long shape, and moves in a longitudinal direction at the time of recording and playback.

Figure 1:
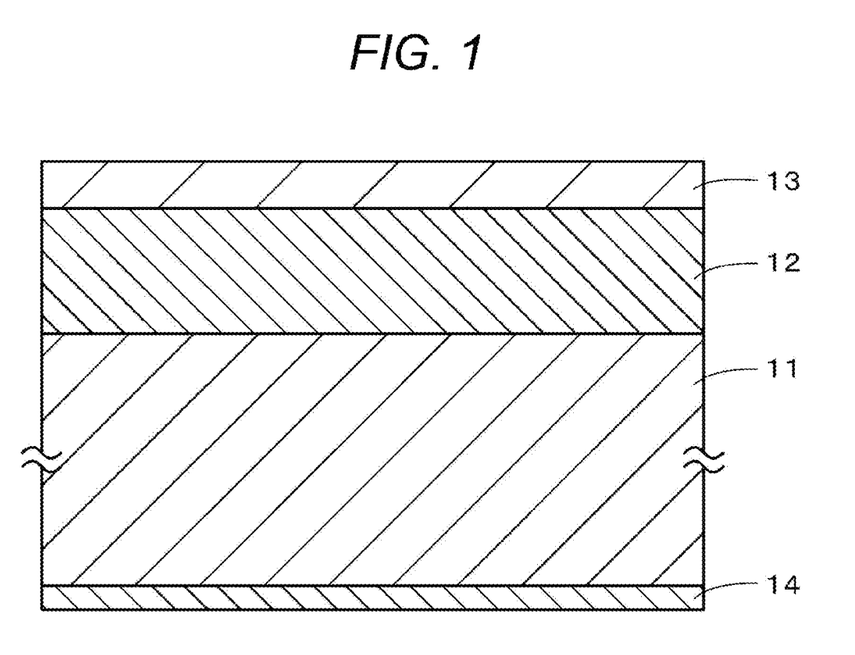
FIG. 1 is a cross-sectional drawing which shows a configuration of the magnetic recording medium according to one embodiment of the present technology.

The magnetic recording medium includes a long base 11, an under layer (non-magnetic layer) 12 provided on one principal plane of the base 11, and a recording layer (magnetic layer) 13 provided on the underlayer 12 as shown in FIG. 1. The magnetic recording medium may further include, for example, a protective layer (not shown), a lubricant layer (not shown), and the like provided on the recording layer 13 as needed, and also may further include a back coating layer 14 provided on the other principal plane of the base 11 as needed.

(Coercive force Hc)

The coercive force He measured in the direction of thickness of (direction perpendicular to) the magnetic recording medium is 220 kA/m or more and 320 kA/m or less, and preferably 230 kA/m or more and 300 kA/m or less. In a case where the coercive force He is less than 220 kA/m, there is a possibility that a good SNR cannot be obtained and NLTS cannot be inhibited. On the other hand, in a case where the coercive force He is above 320 kA/m, there is a possibility that a good SNR cannot be obtained.

The above coercive force He is found as follows. First, a measurement sample is cut out of a long magnetic recording medium, and the M-H loop of the whole measurement sample is measured in the direction of thickness of the measurement sample (the direction perpendicular to the surface of the magnetic recording medium) using a vibrating sample magnetometer (VSM). Next, coating films (e.g. the underlayer 12 and recording layer 13) are removed using e.g. acetone and ethanol to leave only the base 11, and the M-H loop of the base 11 is measured in the direction of thickness of the base 11 for background correction in a similar manner. After that, the M-H loop of the base 11 is subtracted from the M-H loop of the whole measurement sample to calculate the M-H loop after background correction. The coercive force He is found from the obtained M-H loop. It should be noted that the above M-H loops all are measured at room temperature (23° C.).

(NLTS)

NLTS is 20% or less, preferably 17% or less, and more preferably 15% or less.

In a case where NLTS is above 20%, SNR deteriorates with a strong influence from a previously recorded magnetic signal. It is difficult to remove NLTS itself because the magnetic field of a recording head is generated with influence from the demagnetization field of a previously recorded magnetization signal; however, an influence from the demagnetization field can be reduced by increasing coercive force Hc.

(Arithmetic Average Roughness Ra)

The arithmetic average roughness Ra of the surface on the side of the recording layer 13 is preferably 2.5 nm or less, and more preferably 2.0 nm or less. In a case where Ra is 2.5 nm or less, a better SNR can be obtained.

The above arithmetic average roughness Ra is found as follows. First, the surface on the side of the recording layer 13 is observed using an atomic force microscope (AFM) (Dimension Icon manufactured by Bruker) to obtain a cross-sectional profile. Next, the arithmetic average roughness Ra is found from the obtained cross-sectional profile in accordance with JIS B0601:2001.

(Squareness Ratio S)

The squareness ratio S of the magnetic recording medium measured in a moving direction is preferably 30% or less, and more preferably 25% or less. In a case where the squareness ratio S is 30% or less, the vertical orientation of magnetic powder sufficiently increases, and thus a better SNR can be obtained.

The above squareness ratio S is found as follows. First, a measurement sample is cut out of a long magnetic recording medium, and the M-H loop of the whole measurement sample in a moving direction (a longitudinal direction) of the magnetic recording medium is measured using VSM. Next, coating films (e.g. the underlayer 12 and recording layer 13) are removed using e.g. acetone and ethanol to leave only the base 11, and the M-H loop of the base 11 is measured in the moving direction for background correction in a similar manner. After that, the M-H loop of the base 11 is subtracted from the M-H loop of the whole measurement sample to calculate the M-H loop after background correction. The squareness ratio S (%) is calculated by substituting the saturation magnetization Ms (emu) and residual magnetization Mr (emu) of the obtained M-H loop in the following formula. It should be noted that the above M-H loops all are measured at room temperature (23° C.).

$$\text{Squareness ratio } S\ (\%) = Mr/Ms \times 100$$

(Activation Volume $V_{act}$)

The activation volume $V_{act}$ is preferably 5000 nm³ or less, more preferably 4000 nm³ or less, and further more preferably 3000 nm³ or less. In a case where the activation volume $V_{act}$ is 5000 nm³ or less, a bit inversion region can be made sharp, and a better SNR is obtained.

The above activation volume $V_{act}$ is found by the following formula derived by Street & Woolley.

$$V_{act}\ (\text{nm}^3) = k_B \times T \times X_{irr}/(\mu_0 \times Ms \times S)$$

(provided that $k_B$: Boltzmann constant ($1.38 \times 10^{-23}$ J/K), T: temperature (K), $X_{irr}$: irreversible susceptibility, $\mu_0$: vacuum permeability, S: magnetic viscosity coefficient, Ms: saturation magnetization (emu/cm³)).

The irreversible susceptibility $X_{irr}$, saturation magnetization Ms and magnetic viscosity coefficient S substituted in the above formula are found using a vibrating sample magnetometer (VSM) as follows. It should be noted that the direction of measurement by VSM is a direction perpendicular to a recording surface of the magnetic recording medium. In addition, the measurement by VSM is carried out on a measurement sample cut out of a long magnetic recording medium at room temperature (23° C.).

(Irreversible susceptibility $X_{irr}$)

The irreversible susceptibility $X_{irr}$ is defined as a slope around the residual coercive force Hr in the slope of a residual magnetization curve (DCD curve). First, a magnetic field of −1193 kA/m (15 kOe) is applied to a whole magnetic recording medium, and the magnetic field is returned to 0 to obtain a residual magnetization state. After that, a magnetic field of about 15.9 kA/m (200 Oe) is applied in the opposite direction, and the magnetic field is returned to 0 again to measure the amount of residual magnetization. After that, a measurement in which a magnetic field greater than the previously applied magnetic field by 15.9 kA/m is applied and the magnetic field is returned to 0 in a similar manner is repeatedly carried out, and the amount of residual magnetization is plotted against the applied magnetic field to measure a DCD curve. In the obtained DCD curve, a point with an amount of magnetization of 0 is decided as the residual coercive force Hr, and the DCD curve is further differentiated to find a slope of the DCD curve in each magnetic field. In this slope of the DCD curve, the slope around the residual coercive force Hr is used as $X_{irr}$.

(Saturation Magnetization Ms)

First, the M-H loop of a whole magnetic recording medium (measurement sample) is measured in a direction perpendicular to the magnetic recording medium. Next, coating films (e.g. the underlayer 12 and recording layer 13) are removed using e.g. acetone and ethanol to leave only the base 11, and the M-H loop of the base 11 is measured in the perpendicular direction for background correction in a similar manner. After that, the M-H loop of the base 11 is subtracted from the M-H loop of the whole magnetic recording medium to calculate the M-H loop after background correction. Ms (emu/cm³) is calculated from a value of saturation magnetization Ms (emu) of the obtained M-H loop and a volume (cm³) of the recording layer 13 in the measurement sample. It should be noted that the volume of the recording layer 13 is found by multiplying the area of the measurement sample by the average thickness $\delta_{mag}$ of the recording layer 13. The method for calculating the average thickness $\delta_{mag}$ of the recording layer 13, which is needed to calculate the volume of the recording layer 13, will be described later.

(Magnetic Viscosity Coefficient S)

First, a magnetic field of −1193 kA/m (15 kOe) is applied to a whole magnetic recording medium (measurement sample), and the magnetic field is returned to 0 to obtain a residual magnetization state. After that, a magnetic field equal to a residual coercive force Hr value obtained from the DCD curve is applied in the opposite direction. The amount of magnetization is continuously measured for 1000 seconds at fixed time intervals with the magnetic field applied. A relationship between the time t and the amount of magnetization M(t) thus obtained is applied to the following formula to calculate a magnetic viscosity coefficient S.

$$M(t)=M0+S\times \ln(t)$$

(provided that M(t): the amount of magnetization at a time t, M0: the initial amount of magnetization, S: a magnetic viscosity coefficient, ln(t): the natural logarithm of time).

(Base)

The base 11, a support, is a long non-magnetic base having flexibility. The non-magnetic base is a film, and the thickness of the film is, for example, 3 μm or more and 8 μm or less. As a material for the base 11, for example, polyesters such as polyethylene terephthalate, polyolefins such as polyethylene and polypropylene, cellulose derivatives such as cellulose triacetate, cellulose diacetate and cellulose butyrate, vinyl resins such as polyvinyl chloride and polyvinylidene chloride, plastics such as polycarbonate, polyimide and polyamideimide, light metals such as aluminum alloys and titanium alloys, and ceramics such as alumina glass and the like can be used.

(Recording Layer)

The recording layer 13 is what is called a perpendicular recording layer, and includes, for example, magnetic powder, a binding agent and electroconductive particles. The recording layer 13 may further include additives such as a lubricant, an abrasive and a corrosion inhibitor as needed.

(Magnetic powder)

The magnetic powder includes powder of ε-iron oxide-containing nanoparticles (hereinafter, referred to as "ε-iron oxide particles"). The ε-iron oxide particles have a spherical shape or an almost spherical shape, or a cube shape or an almost cube shape. In a case where ε-iron oxide particles are used as magnetic particles, because ε-iron oxide particles have shapes as described above, the contact area of particles in the direction of thickness of a medium is reduced and coagulation of particles can be inhibited as compared to a case where hexagonal tabular barium ferrite particles are used as magnetic particles. Therefore, the dispersibility of magnetic powder increases and SNR can be improved.

Figure 2:
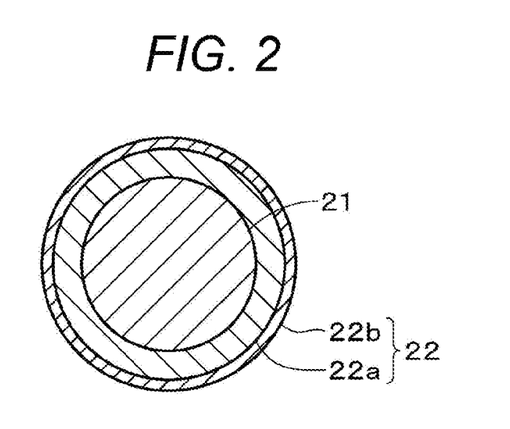
FIG. 2 is a cross-sectional drawing which shows a configuration of magnetic particles.

The ε-iron oxide particles are ε-iron oxide particles having a core-shell structure. Specifically, the ε-iron oxide particles include a core unit 21 and a shell unit 22 having a two-layer structure provided on the periphery of this core unit 21 as shown in FIG. 2. The shell unit 22 having a two-layer structure includes a first shell unit 22a provided on the core unit 21, and a second shell unit 22b provided on the first shell unit 22a.

The core unit 21 includes ε-iron oxide particles. The ε-iron oxide included in the core unit 21 is preferably one having $\varepsilon Fe_2O_3$ crystals as a main phase, and more preferably one including single-phase $\varepsilon Fe_2O_3$.

The first shell unit 22a, a soft magnetic layer, covers at least part of the periphery of the core unit 21. Specifically, the first shell unit 22a may partially cover the periphery of the core unit 21, or may cover the whole periphery of the core unit 21. It is preferred that the first shell unit 22a cover the whole surface of the core unit 21 from the viewpoint that exchange coupling between the core unit 21 and the first shell unit 22a is made sufficient and magnetic characteristics are improved.

The first shell unit 22a is what is called a soft magnetic layer, and includes, for example, a soft magnetic substance such as α-Fe, Ni—Fe alloy or Fe—Si—Al alloy. α-Fe may be one which is obtained by reducing ε-iron oxide included in the core unit 21.

The second shell unit 22b is an oxide coating as an oxidation protection layer. The second shell unit 22b includes α-iron oxide, aluminum oxide or silicon oxide. α-Iron oxide may be one which is obtained by oxidizing α-Fe (a soft magnetic substance) included in the first shell unit 22a. α-Fe includes, for example, at least one iron oxide of $Fe_3O_4$, $Fe_2O_3$ or FeO.

As described above, in a prospective magnetic recording medium with a high recording density, it becomes important that a good SNR can be obtained and NLTS is inhibited. In order to obtain such characteristics, it is required to use magnetic particles with a small particle size and a high coercive force Hc. As magnetic powder in a prospective magnetic recording medium with a high recording density, various powders have been considered; however, ε-iron oxide particles are particularly preferred from the viewpoint of having a small particle size and a high coercive force Hc.

In a case where ε-iron oxide particles have a core-shell structure as described above, because the coercive force He as the whole ε-iron oxide particles (core-shell particles) can be adjusted to a coercive force He suitable for recording while maintaining the coercive force He of the core unit 21 alone to a great value to secure heat stability, the ease of recording increases. In addition, in the step of producing a magnetic recording medium or before the step, ε-iron oxide particles are exposed to air to generate e.g. rust on the surface of particles, and thus a decrease in the characteristics of ε-iron oxide particles can be inhibited. Therefore, the deterioration of characteristics in a magnetic recording medium can be inhibited.

(Average Particle Size D)

The average particle size (average maximum particle size) D of magnetic powder is preferably 22 nm or less, more preferably 8 nm or more and 22 nm or less, and more preferably 12 nm or more and 22 nm or less. In a case where the average particle size D of magnetic powder is above 22 nm, there is a possibility that a good SNR cannot be obtained and NLTS cannot be inhibited. On the other hand, in a case where the average particle size D of magnetic powder is 8 nm or more, the dispersibility of ε-iron oxide particles is further improved and a better SNR can be obtained.

Figure 3:
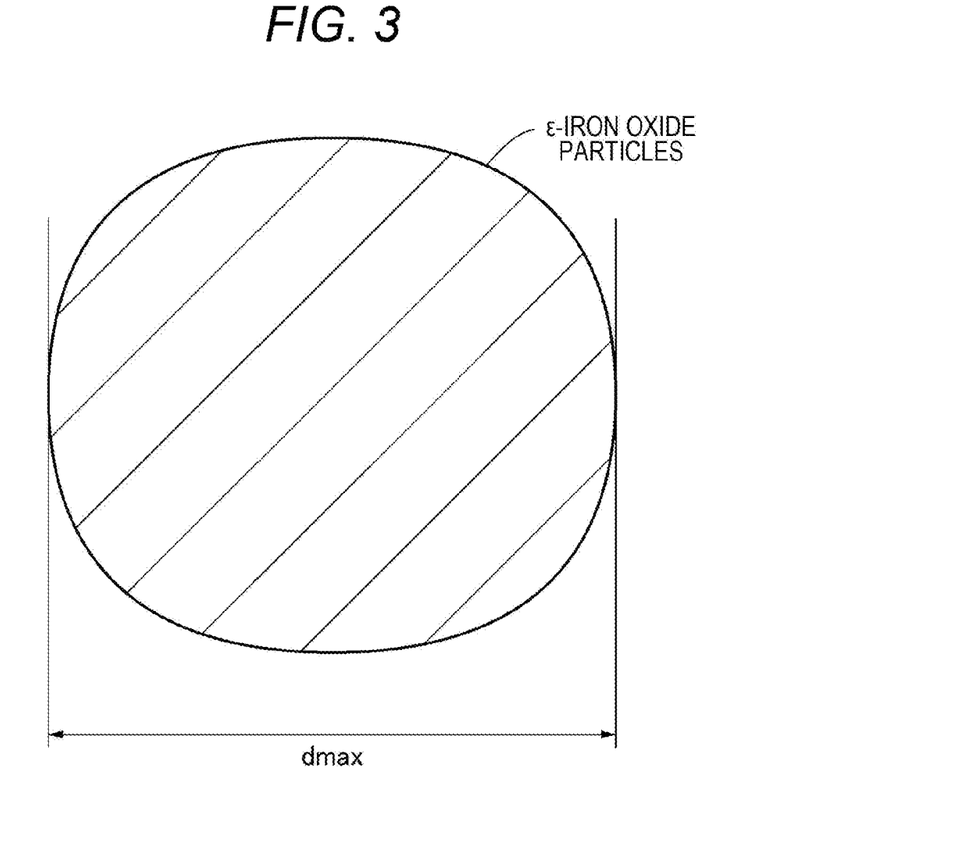
FIG. 3 is a schematic drawing to illustrate the definition of an average particle size.

The above average particle size D of magnetic powder is found as follows. First, a magnetic recording medium as a measurement target is processed by e.g. a focused ion beam (FIB) method to create a section for TEM observation, and the cross-section of the section is observed according to TEM. Next, 500 ε-iron oxide particles are randomly selected from the taken TEM photograph, and the maximum particle size $d_{max}$ of each particle is measured to find the particle size distribution of the maximum particle size $d_{max}$ of magnetic powder. Here, the "maximum particle size $d_{max}$" means what is called the maximum Feret diameter, and specifically indicates the maximum distance between two parallel lines drawn from various angles so that the lines are brought into contact with the outline of ε-iron oxide particles as shown in FIG. 3. After that, the median size (diameter 50%, D50) of the maximum particle size $d_{max}$ is found from the found particle size distribution of the maximum particle size $d_{max}$, and this is the average particle size (average maximum particle size) D of particles.

(Average Thickness $\delta_{mag}$ of Recording Layer)

The average thickness $\delta_{mag}$ of the recording layer 13 is preferably 30 nm or more and 120 nm or less, more preferably 40 nm or more and 100 nm or less, further more preferably 40 nm or more and 80 nm or less, and most preferably 40 nm or more and 70 nm or less. In a case where the average thickness $\delta_{mag}$ is above 120 nm, there is a possibility that a good SNR cannot be obtained and NLTS cannot be inhibited. On the other hand, in a case where the average thickness $\delta_{mag}$ is 30 nm or more, a better SNR can be obtained.

The average thickness $\delta_{mag}$ [nm] of the recording layer 13 is found as follows. First, a magnetic recording medium as a measurement target is processed by e.g. a FIB method to create a section for TEM observation, and the cross-section of the section is observed according to TEM. The magnification of observation is preferably at least a hundred thousand fold or more so that the thickness of the recording layer 13 can be clearly observed. Cross-sectional TEM observation is carried out at 5 sites in total each 100 m in the longitudinal direction (moving direction) of the magnetic recording medium. The direction of cross-section TEM observation in each site is the lateral direction (width direction) of the magnetic recording medium. The thickness of the recording layer 13 is observed in evenly 50 points per visual field, and thicknesses of all 5 visual fields are simply averaged (arithmetically averaged) to find the average thickness $\delta_{mag}$ [nm] of the recording layer 13.

(Binding Agent)

The binding agent is preferably a resin having a structure obtained by the cross-linking reaction of e.g. a polyurethane resin or a vinyl chloride resin. However, the binding agent is not limited thereto, and another resin may be properly mixed depending on physical properties required as a magnetic recording medium, for example. As the resin mixed, commonly resins generally used in coating type magnetic recording media are not particularly limited.

Examples thereof include polyvinyl chloride, polyvinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, vinyl chloride-acrylonitrile copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrenebutadiene copolymers, polyester resins, amino resins, synthetic rubber and the like.

In addition, examples of thermosetting resins or reactive resins include phenol resins, epoxy resins, urea resins, melamine resins, alkyd resins, silicone resins, polyamine resins, urea formaldehyde resins and the like.

In addition, a polar functional group such as $-SO_3M$, $-OSO_3M$, $-COOM$ or $P=O(OM)_2$ may be introduced into each binding agent described above for the purpose of improving the dispersibility of magnetic powder. Here, M in the formulae is a hydrogen atom or an alkali metal such as lithium, potassium or sodium.

Furthermore, examples of the polar functional group include a side chain type group having an end group such as $-NR1R2$ or $-NR1R2R3^+X^-$, and a main chain type group such as $>NR1R2^+X^-$. Here, R1, R2 and R3 in the formulae are a hydrogen atom or a hydrocarbon group, and $X^-$ is a halogen ion such as fluorine, chlorine, bromine or iodine, or an organic or inorganic ion. In addition, examples of the polar functional group include also $-OH$, $-SH$, $-CN$, an epoxy group and the like.

(Additives)

The recording layer 13 may further include as non-magnetic reinforcing particles aluminum oxide ($\alpha$, $\beta$ or $\gamma$ alumina), chromium oxide, silicon oxide, diamond, garnet, emery, boron nitride, titanium carbide, silicon carbide, titanium carbide, titanium oxide (rutile type or anatase type titanium oxide), and the like.

(Underlayer)

The underlayer 12 is a non-magnetic layer including non-magnetic powder and a binding agent as main components. The underlayer 12 may further include at least one additive of e.g. electroconductive particles, a lubricant, a curing agent or a corrosion inhibitor as needed.

(Average thickness of underlayer)

The average thickness of the underlayer 12 is preferably 0.6 μm or more and 2.0 μm or less, and more preferably 0.8 μm or more and 1.4 μm or less. In a case where the average thickness of the underlayer 12 is less than 0.6 μm, there is a possibility that electromagnetic conversion characteristics deteriorate due to worsening of surface properties. On the other hand, in a case where the average thickness of the underlayer 12 is above 2.0 μm, there is a possibility that coarse protrusions are generated due to uneven drying of coating films and similarly electromagnetic conversion characteristics deteriorate. It should be noted that a method for calculating the above average thickness of the underlayer 12 is similar to the method for calculating the average thickness $\delta_{mag}$ of the recording layer 13.

(Non-Magnetic Powder)

The non-magnetic powder may be an inorganic substance or an organic substance. In addition, the non-magnetic powder may be carbon black or the like. Examples of the inorganic substance include metals, metal oxides, metal carbonates, metal sulfates, metal nitrides, metal carbides, metal sulfides, and the like. Examples of the shape of non-magnetic powder include, but not limited to, various shapes such as a needle shape, a spherical shape, a cubic shape and a plate shape.

(Binding Agent)

The binding agent is similar to those of the above-described recording layer 13.

[Method for Producing Magnetic Recording Medium]

Next, an example of the method for producing a magnetic recording medium having the above-described configuration will be illustrated. First, an underlayer-forming paint is prepared by kneading and dispersing e.g. non-magnetic powder and a binding agent in a solvent. Next, a recording layer-forming paint is prepared by kneading and dispersing e.g. magnetic powder and a binding agent in a solvent. The following solvents, dispersing devices and kneading devices, for example, can be used to prepare the recording layer-forming paint and the underlayer-forming paint.

Examples of solvents used to prepare the above-described paints include ketone solvents such as acetone, methyl ethyl ketone, methyl isobutyl ketone and cyclohexanone, alcohol solvents such as methanol, ethanol and propanol, ester solvents such as methyl acetate, ethyl acetate, butyl acetate, propyl acetate, ethyl lactate and ethylene glycol acetate, ether solvents such as diethylene glycol dimethyl ether, 2-ethoxyethanol, tetrahydrofuran and dioxane, aromatic hydrocarbon solvents such as benzene, toluene and xylene, and halogenated hydrocarbon solvents such as methylene chloride, ethylene chloride, carbon tetrachloride, chloroform and chlorobenzene, and the like. These can be used alone or can be used in proper combination.

As the kneading device used to prepare the above-described paints, for example, a kneading device such as a continuous twin-screw kneader, a continuous twin-screw kneader which can dilute substances in multiple stages, a kneader, a pressure kneader or a roll kneader can be used; however, the kneading device is not particularly limited to these devices. In addition, as the dispersing device used to prepare the above-described paints, for example, a dispersing device such as a roll mill, a ball mill, a horizontal type sand mill, a vertical type sand mill, a spike mill, a pin mill, a tower mill, a pearl mill (e.g. "DCP mill" manufactured by EIRICH, etc.), a homogenizer or an ultrasonic disperser can be used; however, the dispersing device is not particularly limited to these devices.

Next, the underlayer-forming paint is applied onto one principal plane of the base 11 and dried to form the underlayer 12. Subsequently, the recording layer-forming paint is applied onto this underlayer 12 and dried to form the recording layer 13 on the under layer 12. It should be noted that magnetic powder is oriented by a magnetic field in the direction of thickness of the base 11 using e.g. solenoidal coils at the time of drying. After forming the recording layer 13, a protective layer and a lubricant layer may be formed on the recording layer 13 and the back coating layer 14 may be formed on the other principal plane of the base 11 as needed.

After that, the base 11 having the underlayer 12 and the recording layer 13 formed thereon is rewound around a large-diameter core and is subjected to curing treatment. Finally, the base 11 having the underlayer 12 and the recording layer 13 formed thereon is subjected to calendaring treatment and then cutout at a predetermined width. As described above, a target magnetic recording medium is obtained.

Effect

The magnetic recording medium according to one embodiment of the present technology is used in a recording and playback device in which the shortest recording wavelength is 75 nm or less, and has a recording layer including powder of ε-iron oxide particles. The average particle size of ε-iron oxide particles is 22 nm or less, and the coercive force He is 220 kA/m or more and 320 kA/m or less. Because of this, a good SNR can be obtained and NLTS can be kept to, for example, 20% or less.

MODIFIED EXAMPLES

Modified Example 1

In the above-described one embodiment, a case where ε-iron oxide particles have a core-shell structure is illustrated; however, ε-iron oxide particles may include additives in place of the core-shell structure, or may include a core-shell structure and also additives. In this case, part of Fe in ε-iron oxide particles is substituted with an added element. Because ε-iron oxide particles include additives and thus the coercive force He as whole ε-iron oxide particles can be adjusted to a coercive force He suitable for recording, the ease of recording increases. The additives are a metal other than iron, preferably a trivalent metal element, and more preferably one or more metals selected from the group consisting of Al, Ga and In.

ε-Iron oxide included in the core unit 21 is specifically $\epsilon Fe_{2-x}M_xO_3$ crystals (provided that M is a metal element other than iron, preferably a trivalent metal element, and more preferably one or more metal elements selected from the group consisting of Al, Ga and In. x is, for example, 0<x<1).

Modified Example 2

Figure 4:
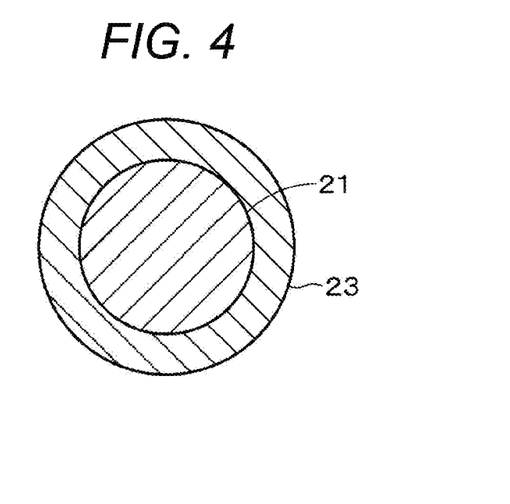
FIG. 4 is a cross-sectional drawing which shows a configuration of magnetic particles.

In the above-described one embodiment, a case where ε-iron oxide particles have a shell unit 22 having a two-layer structure is illustrated; however, ε-iron oxide particles may have a shell unit 23 having a single-layer structure as shown in FIG. 4. In this case, the shell unit 23 has a configuration similar to that of the first shell unit 22a. However, it is preferred that ε-iron oxide particles have the shell unit 22 having a two-layer structure like in the above-described one embodiment from the viewpoint of inhibiting the deterioration of characteristics in ε-iron oxide particles.

Modified Example 3

Figure 5:
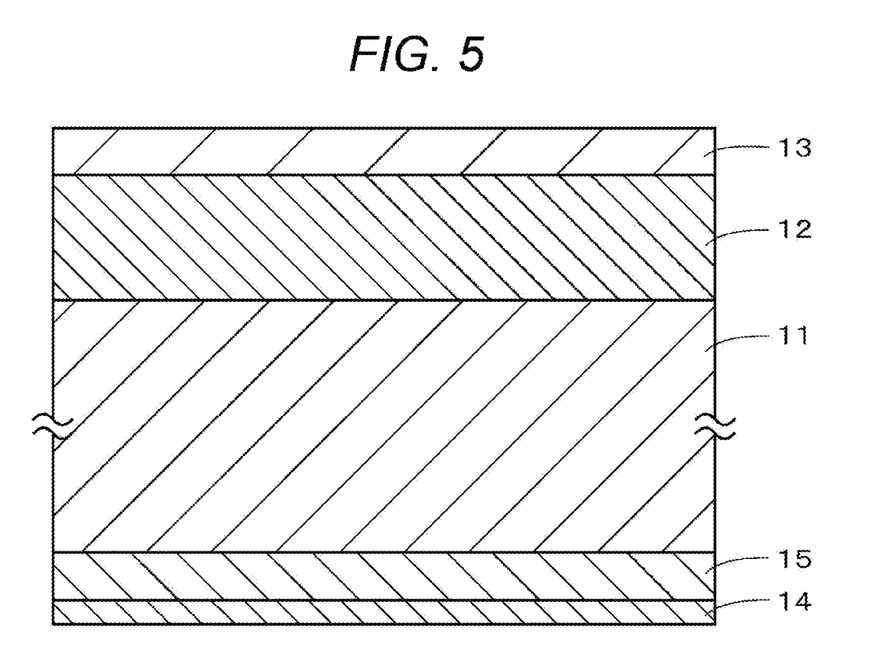
FIG. 5 is a cross-sectional drawing which shows a configuration of a magnetic recording medium.

The magnetic recording medium may further include an enhancement layer 15 provided on the other principal plane on the side of the back coating layer 14 (hereinafter, referred to as "back") of both principal planes of the base 11 as shown in FIG. 5. In this case, the back coating layer 14 is provided on the enhancement layer 15.

It should be noted that the enhancement layer 15 may be provided on either of both principal planes of the base 11, or the enhancement layer 15 may be provided on one principal plane on the side of the recording layer 13 (hereinafter, referred to as "surface") of both principal planes of the base 11. In this case, the underlayer 12 is provided on the enhancement layer 15.

The enhancement layer 15 is configured to increase the mechanical strength of the magnetic recording medium to obtain a good dimensional stability. The enhancement layer 15 includes, for example, at least one of metal or metal compounds. Here, semimetal is defined as metal. The metal is, for example, at least one of aluminum or copper, and preferably copper. This is because copper is cheap and has a relatively low vapor pressure and thus the enhancement layer 15 can be cheaply formed. The metal compound is, for example, a metal oxide. The metal oxide is, for example, at least one of aluminum oxide, copper oxide or silicon oxide, and preferably copper oxide. This is because the enhancement layer 15 can be cheaply formed by e.g. a vapor deposition method. The enhancement layer 15 may be a vapor-deposited film formed by e.g. an oblique vacuum deposition method, or a sputtering film formed by a sputtering method.

It is preferred that the enhancement layer 15 have a laminated structure with two or more layers. As the thickness of the enhancement layer 15 increases, the expansion and contraction of the base 11 due to external force can be further inhibited. However, in a case where the enhancement layer 15 is formed using a vacuum thin film forming technique such as a vapor deposition method or sputtering, there is a possibility that as the thickness of the enhancement layer 15 increases as described above, voids are easily generated in the enhancement layer 15. In a case where the enhancement layer 15 has a laminated structure with two or more layers as described above, voids generated in the enhancement layer 15 at the time of forming the enhancement layer 15 using a vacuum thin film forming technique are inhibited and the accuracy of the enhancement layer 15 can be improved. Therefore, the moisture vapor transmission rate of the enhancement layer 15 can be reduced, and thus the expansion of the base 11 can be further inhibited, and the dimensional stability of the magnetic recording medium can be further improved. In a case where the enhancement layer 15 has a laminated structure with two or more layers, materials for the layers may be the same or different.

The average thickness of the enhancement layer 15 is preferably 150 nm or more and 500 nm or less. In a case where the average thickness of the enhancement layer 15 is 150 nm or more, a good function as the enhancement layer 15 (that is, a good dimensional stability of the magnetic recording medium) is obtained. On the other hand, even in a case where the average thickness of the enhancement layer 15 is not above 500 nm, a sufficient function as the enhancement layer 15 is obtained. It should be noted that the above average thickness of the enhancement layer 15 is found in a similar manner to the above-described method for calculating the average thickness $\delta_{mag}$ of the recording layer 13.

In a case where the magnetic recording medium has the enhancement layer 15, the Young's modulus of a long magnetic recording medium in a longitudinal direction is preferably 7 GPa or more and 14 GPa or less. In a case where the Young's modulus is 7 GPa or more, a good contact with a magnetic head can be obtained and edge damage can be inhibited. On the other hand, in a case where the Young's modulus is 14 GPa or less, a good contact with a magnetic head can be obtained.

In addition, the humidity expansion coefficient of the magnetic recording medium is preferably 0.5 ppm/% RH or more and 4 ppm/% RH or less. In a case where the humidity expansion coefficient is within the above range, the dimensional stability of the magnetic recording medium can be further improved.

Modified Example 4

Figure 6:
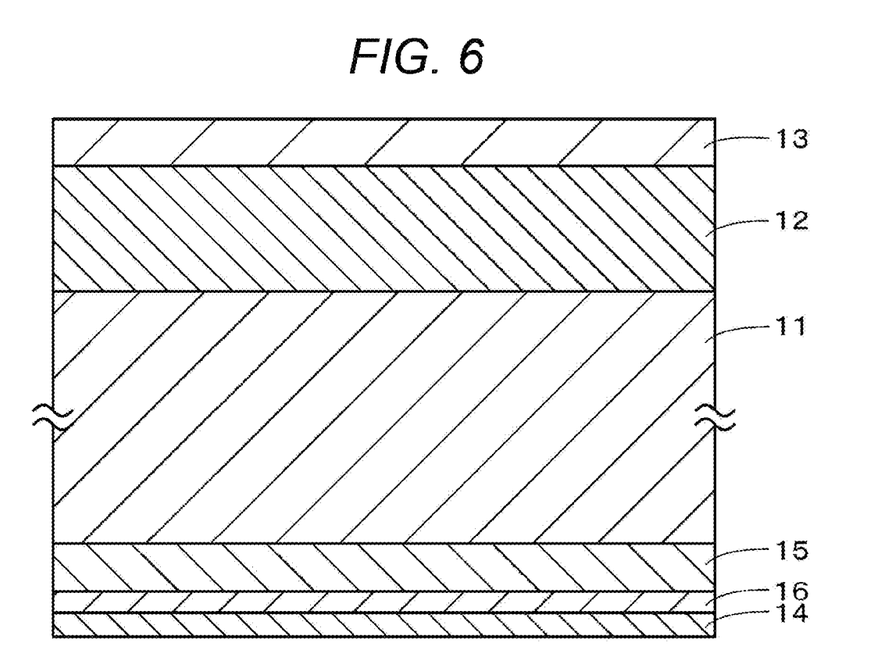
FIG. 6 is a cross-sectional drawing which shows a configuration of a magnetic recording medium.

The magnetic recording medium may further include a cupping inhibiting layer 16 provided on the enhancement layer 15 as shown in FIG. 6. It should be noted that in a case where the underlayer 12 and cupping inhibiting layer 16 are provided on the back of the base 11, the back coating layer 14 is provided on the cupping inhibiting layer 16. On the other hand, in a case where the underlayer 12 and cupping inhibiting layer 16 are provided on the surface of the base 11, the underlayer 12 is provided on the cupping inhibiting layer 16.

The cupping inhibiting layer 16 is configured to inhibit cupping generated by forming the enhancement layer 15 on the base 11. Here, cupping means a bend generated in the width direction of a long base 11. Tensile stress, that is, a stress which bends a principal plane provided with the enhancement layer 15 of both principal planes of the base 11 in the width direction in a concave shape, acts as internal stress on the enhancement layer 15. Contrarily, compressive stress, that is, a stress which bends a principal plane provided with the cupping inhibiting layer 16 of both principal planes of the base 11 in the width direction in a convex shape, acts as internal stress on the cupping inhibiting layer 16. Because of this, internal stresses of the enhancement layer 15 and the cupping inhibiting layer 16 are offset to each other, and the occurrence of cupping in a magnetic recording medium can be inhibited. Therefore, the contact state of a magnetic head and a magnetic recording medium can be kept good, and a magnetic recording medium which has a high dimensional stability in the direction of track width, excellent off-track characteristics, and a high SN can be provided.

The cupping inhibiting layer 16 is, for example, a carbon thin film. The carbon thin film is preferably a hard carbon thin film including diamond-like carbon (hereinafter referred to as "DLC"). The cupping inhibiting layer 16 may be, for example, a CVD film formed by a chemical vapor deposition (CVD) method, or a sputtering film formed by a sputtering method.

It is preferred that the cupping inhibiting layer 16 have a laminated structure with two or more layers. This is because the dimensional stability of the magnetic recording medium can be further improved. It should be noted that the principle is similar to that of a case where the enhancement layer 15 has a laminated structure with two or more layers. In a case where the cupping inhibiting layer 16 has a laminated structure with two or more layers, materials for the layers may be the same or different.

The average thickness of the cupping inhibiting layer 16 is preferably 10 nm or more and 200 nm or less. In a case where the average thickness of the cupping inhibiting layer 16 is less than 10 nm, there is a possibility that the compressive stress of the cupping inhibiting layer 16 is reduced too much. On the other hand, in a case where the average thickness of the cupping inhibiting layer 16 is above 200 nm, there is a possibility that the compressive stress of the cupping inhibiting layer 16 increases too much. It should be noted that the average thickness of the cupping inhibiting layer 16 is found in a similar manner to the above-described method for calculating the average thickness $\delta_{mag}$ of the recording layer 13.

Modified Example 5

Figure 7:
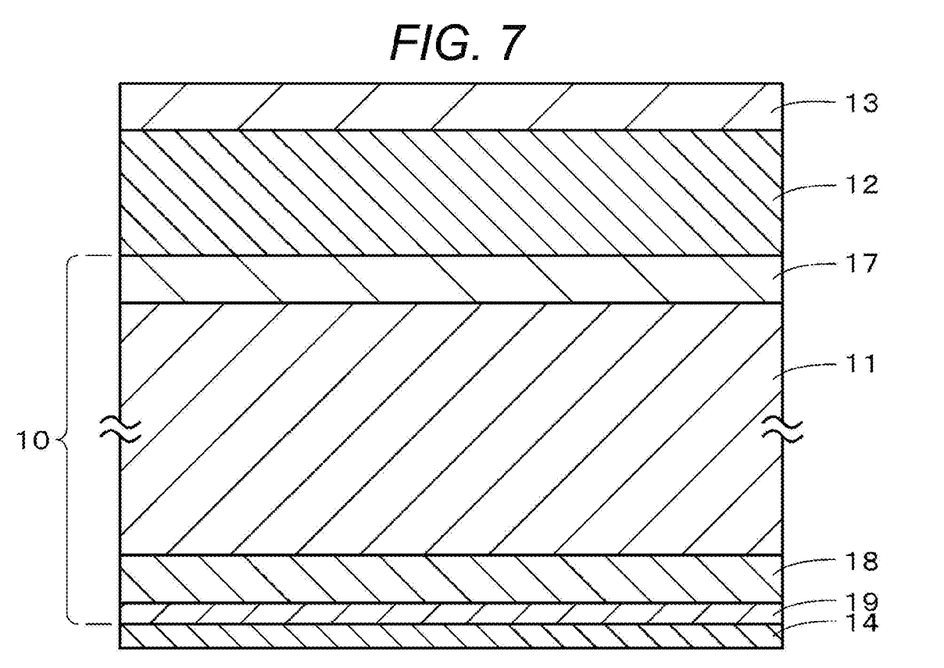
FIG. 7 is a cross-sectional drawing which shows a configuration of a magnetic recording medium.

The magnetic recording medium may further include a first enhancement layer 17 provided on the surface of the base 11, a second enhancement layer 18 provided on the back of the base 11, and an adhesion inhibiting layer 19 provided on the second enhancement layer 18 as shown in FIG. 7. In this case, the back coating layer 14 is provided on the adhesion inhibiting layer 19. A laminate 10 is configured by the base 11, first enhancement layer 17, second enhancement layer 18 and adhesion inhibiting layer 19.

It should be noted that the adhesion inhibiting layer 19 is only needed to be provided on either layer of the first and second enhancement layers 17 and 18, and the adhesion inhibiting layer 19 may be also provided on the first enhancement layer 17. In this case, the underlayer 12 is provided on the adhesion inhibiting layer 19. In a case where the adhesion inhibiting layer 19 is a carbon thin film in this configuration, it is preferred that wettability on the surface of the adhesion inhibiting layer 19 be improved by surface modification treatment. This is because the coating properties of the underlayer-forming paint on a carbon thin film can be improved.

The first and second enhancement layers 17 and 18 are configured to increase the mechanical strength of the magnetic recording medium to obtain an excellent dimensional stability. As materials for the first and second enhancement layers 17 and 18, materials similar to those for the enhancement layer 15 in Modified Example 3 can be given as examples. It should be noted that materials for the first and second enhancement layers 17 and 18 may be the same or different materials. It is preferred that the first and second enhancement layers 17 and 18 each have a laminated structure with two or more layers. This is because the dimensional stability of the magnetic recording medium can be further improved. It should be noted that the principle is similar to that of a case where the enhancement layer 15 has a laminated structure with two or more layers in Modified Example 3.

The average thicknesses of the first and second enhancement layers 17 and 18 are preferably 75 nm or more and 300 nm or less. In a case where the average thicknesses of the first and second enhancement layers 17 and 18 are 75 nm or more, a good function as the first and second enhancement layers 17 and 18 (that is, a good dimensional stability of the magnetic recording medium) is obtained. On the other hand, in a case where the average thicknesses of the first and second enhancement layers 17 and 18 are thick, above 300 nm, there is a possibility that the thickness of the magnetic recording medium becomes thick. In addition, even in a case where the average thicknesses of the first and second enhancement layers 17 and 18 are not above 300 nm, a sufficient function as the first and second enhancement layers 17 and 18 is obtained. It should be noted that the average thicknesses of the first and second enhancement layers 17 and 18 are found in a similar manner to the above-described method for calculating the average thickness $\delta_{mag}$ of the recording layer 13.

Tensile stress acts as internal stress on the first and second enhancement layers 17 and 18. Specifically, a stress which bends the surface of the base 11 in the width direction in a concave shape acts on the first enhancement layer 17, and a stress which bends the back of the base 11 in the width direction in a concave shape acts on the second enhancement layer 18. Therefore, the internal stresses of the first and second enhancement layers 17 and 18 are offset to each other, and the occurrence of cupping in the magnetic recording medium can be inhibited. Here, cupping means a bend generated in the width direction of a long base 11.

The average thicknesses of the first and second enhancement layers 17 and 18 may be the same or different; however, it is preferred that the thicknesses be the same or almost the same. This is because the internal stresses (tensile stress) of the first and second enhancement layers 17 and 18 provided on both planes of the base 11 becomes the same or almost the same and the occurrence of cupping can be further inhibited. Here, almost the same average thicknesses of the first and second enhancement layers 17 and 18 mean that a difference in the average thickness between the first and second enhancement layers 17 and 18 is within 5 nm.

The adhesion inhibiting layer 19 is configured to inhibit the first and second enhancement layers 17 and 18 from sticking together due to metal adhesion in a case where the laminate 10 is wound in a roll shape. The adhesion inhibiting layer 19 may have electroconductive properties or insulating properties. The adhesion inhibiting layer 19 may be one on which compressive stress (that is, a stress which bends a plane provided with the adhesion inhibiting layer 19 of both principal planes of the base 11 in the width direction in a convex shape) acts as internal stress, or tensile stress (that is, a stress which bends a plane provided with the adhesion inhibiting layer 19 of the base 11 in the width direction in a concave shape) acts as internal stress.

In a case where the tensile stresses (internal stresses) of the first and second enhancement layers 17 and 18 are different, the adhesion inhibiting layer 19 on which compressive stress acts as internal stress may be provided on an enhancement layer with a greater tensile stress of the first and second enhancement layers 17 and 18. This is because tensile stress which has not been completely offset due to a difference in tensile stress between the first and second enhancement layers 17 and 18 can be offset due to compressive stress of the adhesion inhibiting layer 19. In addition, the adhesion inhibiting layer 19 on which tensile stress acts as internal stress may be provided on an enhancement layer with a smaller tensile stress of the first and second enhancement layers 17 and 18. This is because compressive stress which has been generated due to a difference in tensile stress between the first and second enhancement layers 17 and 18 can be offset due to the tensile stress of the adhesion inhibiting layer 19.

The average thickness of the adhesion inhibiting layer 19 is preferably 1 nm or more and 100 nm or less, more preferably 2 nm or more and 25 nm or less, and further more preferably 2 nm or more and 20 nm or less. In a case where the average thickness of the adhesion inhibiting layer 19 is 1 nm or more, a decrease in function as the adhesion inhibiting layer 19 due to the average thickness of the adhesion inhibiting layer 19 becoming too thin can be inhibited. On the other hand, a case where the average thickness of the adhesion inhibiting layer 19 is 100 nm or less can inhibit the average thickness of the adhesion inhibiting layer 19 from becoming too thick, that is, can inhibit the internal stress of the adhesion inhibiting layer 19 from becoming too great. The average thickness of the adhesion inhibiting layer 19 is found in a similar manner to the above-described method for calculating the average thickness $\delta_{mag}$ of the recording layer 13.

In a case where the average thickness D2 of the second enhancement layer 18 is 75 nm or more and 300 nm or less, it is preferred that the ratio of the average thickness D4 of the adhesion inhibiting layer 19 to the average thickness D2 of the second enhancement layer 18 (D4/D2) be 0.005 or more and 0.35 or less. In a case where the ratio (D4/D2) is 0.005 or more, a decrease in function as the adhesion inhibiting layer 19 due to the average thickness D4 of the adhesion inhibiting layer 19 becoming too thin compared to the average thickness D2 of the second enhancement layer 18 can be inhibited. On the other hand, a case where the ratio (D4/D2) is 0.35 or less can inhibit the average thickness D4 of the adhesion inhibiting layer 19 from becoming too thick compared to the average thickness D2 of the second enhancement layer 18, that is, can inhibit the compressive stress of the adhesion inhibiting layer 19 from becoming too great compared to tensile stress of the second enhancement layer 18. Therefore, the occurrence of cupping can be further inhibited.

The adhesion inhibiting layer 19 includes, for example, at least one of carbon or metal oxides. It is preferred that the adhesion inhibiting layer 19 be a carbon thin film having carbon as a main component or a metal oxide film having a metal oxide as a main component. It is preferred that carbon be diamond-like carbon (hereinafter referred to as "DLC"). It is preferred that the metal oxide include at least one of aluminum oxide, copper oxide or cobalt oxide. The adhesion inhibiting layer 19 may be, for example, a CVD film formed by a chemical vapor deposition (CVD) method, or a sputtering film formed by a sputtering method.

It is preferred that the adhesion inhibiting layer 19 have a laminated structure with two or more layers. This is because the dimensional stability of the magnetic recording medium can be further improved. It should be noted that the principle is similar to that of a case where the enhancement layer 15 has a laminated structure with two or more layers in Modified Example 3. In a case where the adhesion inhibiting layer 19 has a laminated structure with two or more layers, materials for the layers may be the same or different.

In a magnetic recording medium having the above-described configuration, the occurrence of cupping in the magnetic recording medium can be inhibited by offsetting the internal stresses (tensile stresses) of the first and second enhancement layers 17 and 18. Therefore, the contact state of a magnetic head and the magnetic recording medium can be kept good, and the magnetic recording medium having a high dimensional stability in the direction of track width, excellent off-track characteristics and a high SN can be provided. In addition, in a case where the laminate 10 is wound in a roll shape in the step of producing a magnetic recording medium, because the adhesion inhibiting layer 19 exists between the first and second enhancement layers 17 and 18, metal adhesion of the first and second enhancement layers 17 and 18 can be inhibited.

Modified Example 6

The magnetic recording medium may be configured to be able to record signals at a shortest recording wavelength of 75 nm or less using a recording and playback device including a recording head other than a ring head.

EXAMPLES

The present technology will now be illustrated in detail byway of Examples thereof. The present technology, however, is not limited only to these Examples.

In Examples 1 to 16 and Comparative Examples 1 to 12 below, the average particle size D, the coercive force Hc, the activation volume $V_{act}$, the arithmetic average roughness Ra, the squareness ratio S and the average thickness $\delta_{mag}$ of a recording layer were found by methods illustrated in the above-described one embodiment.

Table 1 shows the configuration of magnetic powder used in Examples 1 to 16 and Comparative Examples 1 to 12.

TABLE 1

| | CORE UNIT | FIRST SHELL UNIT (SOFT MAGNETISM) | SECOND SHELL UNIT (OXIDE COATING) |
|---|---|---|---|
| PARTICLES A | ε-IRON OXIDE | aFe | aFe$_2$O$_3$ |
| PARTICLES B | ε-IRON OXIDE | aFe | Al$_2$O$_3$ |
| PARTICLES C | ε-IRON OXIDE | Ni—Fe ALLOY | Al$_2$O$_3$ |
| PARTICLES D | Al-ADDED ε-IRON OXIDE | NONE | NONE |
| PARTICLES E | Ga-ADDED ε-IRON OXIDE | NONE | NONE |
| PARTICLES F | ε-IRON OXIDE | NONE | NONE |

It should be noted that "Al-added ε-iron oxide" means ε-iron oxide in which part of Fe included in ε-iron oxide is substituted with Al, and "Ga-added ε-iron oxide" means ε-iron oxide in which part of Fe included in ε-iron oxide is substituted with Ga.

Example 1

(Step of Preparing Recording Layer-Forming Paint)
A recording layer-forming paint was prepared as follows. First, a first composition of the following combination was kneaded by an extruder. Next, the first composition and a second composition of the following combination were added to a stirring tank equipped with Disper, and preliminarily mixed. After that, the obtained mixture was further mixed by a sand mill, and subjected to filter treatment to prepare a recording layer-forming paint.

(First Composition)
Magnetic powder of particles A: 100 parts by mass (average particle size 17 nm (see Table 2)),
Vinyl chloride resin (cyclohexanone solution 30 mass %): 10 parts by mass,
(polymerization degree 300, Mn=10000, including OSO$_3$K=0.07 mmol/g, secondary OH=0.3 mmol/g as polar groups),
Aluminum oxide powder: 5 parts by mass
(α-Al$_2$O$_3$, average particle diameter 0.2 μm), and
Carbon black: 2 parts by mass
(trade name: SEAST TA manufactured by TOKAI CARBON CO., LTD.)
(Second Composition)
Vinyl chloride resin: 1.1 parts by mass
(resin solution: resin content 30 mass %, cyclohexanone 70 mass %),
n-Butyl stearate: 2 parts by mass,
Methyl ethyl ketone: 121.3 parts by mass,
Toluene: 121.3 parts by mass, and
Cyclohexanone: 60.7 parts by mass.
(Step of Preparing Underlayer-Forming Paint)
An underlayer-forming paint was prepared as follows. First, a third composition of the following combination was kneaded by an extruder. After that, the third composition and a fourth composition of the following combination were added to a stirring tank equipped with Disper, and preliminarily mixed. After that, the obtained mixture was further mixed by a sand mill, and subjected to filter treatment to prepare an underlayer-forming paint.
(Third Composition)
Needle-shaped iron oxide powder: 100 parts by mass
(α-Fe$_2$O$_3$, average long axis length 0.15 μm),
Vinyl chloride resin: 55.6 parts by mass
(resin solution: resin content 30 mass %, cyclohexanone 70 mass %), and
Carbon black: 10 parts by mass
(average particle diameter 20 nm).
(Fourth Composition)
Polyurethane resin UR8200 (manufactured by Toyo Boseki): 18.5 parts by mass,
n-Butyl stearate: 2 parts by mass,
Methyl ethyl ketone: 108.2 parts by mass,
Toluene: 108.2 parts by mass, and
Cyclohexanone: 18.5 parts by mass.
(Step of Preparing Back Coating Layer-Forming Paint)
A back coating layer-forming paint was prepared as follows. First, raw materials described later were mixed by a stirring tank equipped with Disper, and the obtained mixture was subjected to filter treatment to prepare a back coating layer-forming paint.
Carbon black (trade name: #80 manufactured by ASAHI CARBON CO., LTD.): 100 parts by mass,
Polyester polyurethane: 100 parts by mass
(trade name: N-2304 manufactured by Nippon Polyurethane Industry Co., Ltd.),
Methyl ethyl ketone: 500 parts by mass,
Toluene: 400 parts by mass, and
Cyclohexanone: 100 parts by mass.
Next, polyisocyanate (trade name: Coronate L manufactured by Nippon Polyurethane Industry Co., Ltd.): 4 parts by mass and myristic acid: 2 parts by mass were added as curing agents to each of the recording layer-forming paint and the underlayer-forming paint created as described above.

(Film Forming Step)

An underlayer and a recording layer were formed on a polyethylene naphthalate film (PEN film), a non-magnetic support, with a thickness of 6.2 µm using the paints created as described above as follows. First, the underlayer-forming paint was applied onto the PEN film and dried to form an underlayer on the PEN film. Next, the recording layer-forming paint was applied onto the underlayer and dried to form a recording layer on the underlayer. It should be noted that magnetic powder was oriented by a magnetic field in the direction of thickness of the PEN film using solenoidal coils at the time of drying. Subsequently, the PEN film having the underlayer and recording layer formed thereon was subjected to calendaring treatment to smooth the surface of the recording layer.

As shown in Table 2 the coercive force Hc was 250 kA/m, the activation volume $V_{act}$ was 4800 nm$^3$, the arithmetic average roughness Ra was 2.0 mm, the squareness ratio S of the magnetic tape in a moving direction (longitudinal direction) was 25%, the average thickness of the underlayer was 1100 nm, and the average thickness $\delta_{mag}$ of the recording layer was 70 nm by adjusting various conditions in the above film forming step. After that, the back coating layer-forming paint was applied onto the plane opposite to the recording layer so that the film thickness was 0.6 µm and dried to form a back coating layer.

(Cutting Step)

The PEN film having the underlayer, recording layer and back coating layer formed thereon as described above was cut out at a width of ½ inches (12.65 mm) to obtain a target magnetic tape.

Examples 2, 3 and Comparative Example 1

A magnetic tape was obtained in a similar manner to in Example 1 except that the average particle size of magnetic powder of particles A was changed to 20 nm, 14 nm and 25 nm as shown in Table 2 and Table 3.

Examples 4, 5 and Comparative Examples 2, 3

A magnetic tape was obtained in a similar manner to in Example 1 except that the coercive force Hc was changed to 310 kA/m, 220 kA/m, 200 kA/m and 350 kA/m as shown in Table 2 and Table 3 by adjusting the thickness of a soft magnetic shell layer (first shell unit) of particles A.

Example 6 and Comparative Example 4

A magnetic tape was obtained in a similar manner to in Example 1 except that the activation volume $V_{act}$ was changed to 2600 nm$^3$ and 10000 nm$^3$ as shown in Table 2 and Table 3 by adjusting the dispersion state of magnetic powder of particles A.

Examples 7, 8 and Comparative Example 5

A magnetic tape was obtained in a similar manner to in Example 1 except that the arithmetic average roughness Ra was changed to 2.5 nm, 1.5 nm and 3.0 nm as shown in Table 2 and Table 3 by adjusting pressure in calendaring treatment.

Examples 9, 10 and Comparative Examples 6, 7

A magnetic tape was obtained in a similar manner to in Example 1 except that the squareness ratio S of the magnetic tape in a moving direction (longitudinal direction) was changed to 30%, 20%, 45% and 35% as shown in Table 2 and Table 3 by adjusting the amount of drying air in orientation magnetic field at the time of forming a recording layer.

Examples 11, 12 and Comparative Examples 8, 9

A magnetic tape was obtained in a similar manner to in Example 1 except that the average thickness $\delta_{mag}$ of the recording layer was changed to 120 nm, 40 nm, 150 nm and 25 nm as shown in Table 2 and Table 3 by adjusting the thickness of the recording layer-forming paint applied and pressure in calendaring treatment.

Examples 13 to 16 and Comparative Example 10

A magnetic tape was obtained in a similar manner to in Example 1 except that magnetic powders of particles B, particles C, particles D, particles E, and particles F were used in place of magnetic powder of particles A as shown in Table 2 and Table 3.

Comparative Example 11

A magnetic tape was obtained in a similar manner to in Example 1 except that magnetic powder of barium ferrite (BaFe) particles was used in place of magnetic powder of particles A as shown in Table 3.

Comparative Example 12

A magnetic tape was obtained in a similar manner to in Example 1 except that magnetic powder of Fe—Co alloy metal was used in place of magnetic powder of particles A as shown in Table 3.

[Evaluation of Magnetic Tape]

The magnetic tapes in Examples 1 to 16 and Comparative Examples 1 to 12 obtained as described above were evaluated as follows.

(Measurement of NLTS)

Figure 8:
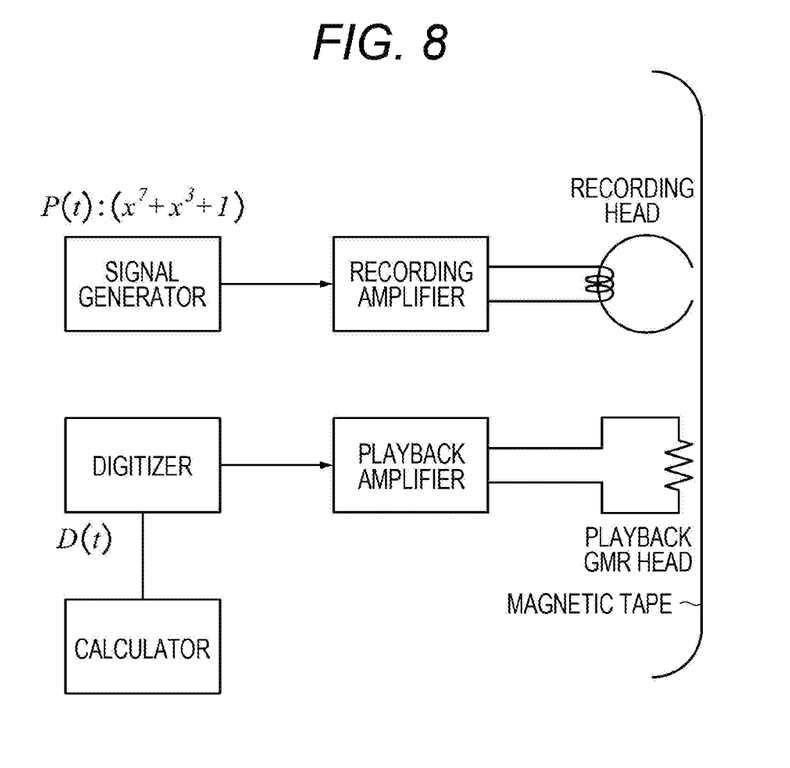
FIG. 8 is a block diagram which shows a configuration of a measuring device.

The configuration of a measuring device is shown in FIG. 8. Recording/playback heads and recording/playback amplifiers were attached to a ½ inch tape moving device (MTS Transport manufactured by Mountain Engineering II), and NLTS was measured using the obtained magnetic tapes. A ring head with a gap length of 0.2 m as the recording head, and also a GMR head with a shield distance of 0.1 µm as the playback head were used, the relative rate was 6 m/s, and the recording clock frequency was 160 MHz. Recording and playback were carried out using a 127 bit pseudorandom signal (M sequence) by generator polynomial: $x^7+x^3+1$ as the recording signal sequence. The NLTS measurement was quantified by the amplitude ratio [%] of echo pulse and main dipulse extracted from the obtained playback signal by a dibit echo extraction method.

<Dibit Echo Extraction Method>

It has been known that NLTS can be extracted by calculating the dibit response of the recording/playback system in e.g. the following documents (A) and (B):

(A) D. Palmer, P. Ziperovich, R. Wood, T. D. Howell: "Identification of Nonlinear Write Effects Using Pseudorandom Sequences.", IEEE Trans. Man., 23, pp. 2377-2379 (1997), and (B) Uehara, Majima, Ogawa: "A Study on a Method for Measuring Nonlinear Magnetic Transition Shifts in Magnetic Recording", The journal of the Institute of Television Engineers of Japan. Vol. 49, No. 11, pp. 1522-1528 (1995).

The above-described 127 bit pseudorandom signal sequence P(t) and a playback signal sequence D(t) collected by a digitizer were used to calculate the dibit response. These signal sequences were subjected to discrete Fourier transformation to calculate a transfer function of the system T(f)=Fourier[D(t)]/Fourier[P(t)], and this transfer function T(f) was subjected to inverse Fourier transformation to find a dipulse response T(t). The main dipulse echo appears at a site, which is decided depending on a generator polynomial for a pseudorandom signal and a factor of non linear distortion, on the dipulse response, and the non linear distortion of the recording/playback system can be quantitatively estimated by the generated site and size of the echo.

(SNR)

The SNR (electromagnetic conversion characteristics) of a magnetic tape was measured as follows. The measurement was carried out using similar recording/playback heads, recording/playback amplifiers and moving mechanical device to in the above NLTS measurement in the same conditions of the relative rate and recording clock frequency. Document (C) was used as a reference for calculation of SNR:

(C) Y. Okazaki: "An Error Rate Emulation System.", IEEE Trans. Man., 31, pp. 3093-3095 (1995).

Table 2 shows the configuration and evaluation results of the magnetic tapes in Examples 1 to 16.

TABLE 2

|  | MAGNETIC POWDER | D (nm) | Hc (kA/m) | NLTS (%) | Vact (nm3) | Ra (nm) | S (%) | δmag (nm) | SNR (dB) |
|---|---|---|---|---|---|---|---|---|---|
| EXAMPLES 1 | PARTICLES A | 17 | 250 | 17 | 4800 | 2.0 | 25 | 70 | 1.5 |
| EXAMPLES 2 | PARTICLES A | 20 | 250 | 20 | 4800 | 2.0 | 25 | 70 | 1.2 |
| EXAMPLES 3 | PARTICLES A | 14 | 250 | 17 | 3000 | 2.0 | 25 | 70 | 1.6 |
| EXAMPLES 4 | PARTICLES A | 17 | 310 | 17 | 4800 | 2.0 | 25 | 70 | 1.8 |
| EXAMPLES 5 | PARTICLES A | 17 | 220 | 17 | 4800 | 2.0 | 25 | 70 | 1.2 |
| EXAMPLES 6 | PARTICLES A | 17 | 250 | 13 | 2600 | 2.0 | 25 | 70 | 2 |
| EXAMPLES 7 | PARTICLES A | 17 | 250 | 17 | 4800 | 2.5 | 25 | 70 | 1.2 |
| EXAMPLES 8 | PARTICLES B | 17 | 250 | 17 | 4800 | 1.5 | 25 | 70 | 1.6 |
| EXAMPLES 9 | PARTICLES C | 17 | 250 | 20 | 4800 | 2.0 | 30 | 70 | 1.1 |
| EXAMPLES 10 | PARTICLES D | 17 | 250 | 15 | 2600 | 2.0 | 20 | 70 | 1.8 |
| EXAMPLES 11 | PARTICLES E | 17 | 250 | 20 | 4800 | 2.0 | 25 | 120 | 1 |
| EXAMPLES 12 | PARTICLES A | 17 | 250 | 17 | 4800 | 2.0 | 25 | 40 | 1.8 |
| EXAMPLES 13 | PARTICLES B | 17 | 250 | 17 | 4800 | 2.0 | 25 | 70 | 1.3 |
| EXAMPLES 14 | PARTICLES C | 17 | 250 | 17 | 4800 | 2.0 | 25 | 70 | 1.3 |
| EXAMPLES 15 | PARTICLES D | 17 | 250 | 17 | 4800 | 2.0 | 25 | 70 | 1 |
| EXAMPLES 16 | PARTICLES E | 17 | 250 | 17 | 4800 | 2.0 | 25 | 70 | 1 |

Table 3 shows the configuration and evaluation results of the magnetic tapes in Comparative Examples 1 to 12.

TABLE 3

|  | MAGNETIC POWDER | D (nm) | Hc (kA/m) | NLTS (%) | Vact ($nm^3$) | Ra (nm) | S (%) | δmag (nm) | SNR (dB) |
|---|---|---|---|---|---|---|---|---|---|
| COMPARATIVE EXAMPLES 1 | PARTICLES A | 25 | 250 | 24 | 8000 | 2.0 | 25 | 70 | 0.3 |
| COMPARATIVE EXAMPLES 2 | PARTICLES A | 17 | 200 | 25 | 4800 | 2.0 | 25 | 70 | 0.1 |
| COMPARATIVE EXAMPLES 3 | PARTICLES A | 17 | 350 | 18 | 4800 | 2.0 | 25 | 70 | 0.2 |
| COMPARATIVE EXAMPLES 4 | PARTICLES A | 17 | 250 | 30 | 10000 | 2.0 | 25 | 70 | 0 |
| COMPARATIVE EXAMPLES 5 | PARTICLES A | 17 | 250 | 18 | 4800 | 3.0 | 25 | 70 | 0.7 |
| COMPARATIVE EXAMPLES 6 | PARTICLES A | 17 | 200 | 28 | 4800 | 2.0 | 45 | 70 | 0 |
| COMPARATIVE EXAMPLES 7 | PARTICLES A | 17 | 220 | 24 | 4800 | 2.0 | 35 | 70 | 0.3 |
| COMPARATIVE EXAMPLES 8 | PARTICLES A | 17 | 250 | 23 | 4800 | 2.0 | 25 | 150 | 0.4 |
| COMPARATIVE EXAMPLES 9 | PARTICLES A | 17 | 250 | 15 | 4800 | 2.0 | 25 | 25 | 0.6 |
| COMPARATIVE EXAMPLES 10 | PARTICLES F | 17 | 1250 | — | 4800 | 2.0 | 25 | 70 | — |
| COMPARATIVE EXAMPLES 11 | BaFe | 20 | 190 | 24 | 4500 | 2.0 | 25 | 70 | 0 |
| COMPARATIVE EXAMPLES 12 | METAL | 30 | 190 | 30 | 5000 | 2.0 | 60 | 70 | −1 |

Provided that D, Hc, $V_{act}$, Ra, S and $\delta_{mag}$ in Tables 2 and 3 mean the following contents:

D: average particle size, Hc: coercive force, $V_{act}$: activation volume, Ra: arithmetic average roughness, S: the squareness ratio of a magnetic tape in a moving direction (longitudinal direction), and $\delta_{mag}$: the average thickness of a recording layer.

The following are found from Table 2 and Table 3.

It is found that in a case where powder of ε-iron oxide particles is used as magnetic powder, the average particle size D of ε-iron oxide particles is 22 nm or less, the coercive force He is 220 kA/m or more and 320 kA/m or less, the activation volume $V_{act}$ is 5000 nm$^3$ or less, the arithmetic average roughness Ra is 2.5 nm or less, the squareness ratio S of a magnetic tape in a moving direction is 30% or less, and the average thickness $\delta_{mag}$ of a recording layer is 30 nm or more and 120 nm or less, a good SNR can be obtained and NLTS can be kept to 20% or less.

In addition, it is found that the coercive force He can be adjusted to 320 kA/m or less also in a case where ε-iron oxide particles have a core-shell structure or a case where additives are added to ε-iron oxide particles.

The embodiment and Examples of the present technology were illustrated in detail as described above. The present technology, however, is not limited to the above-described embodiment and Examples, and various modification can be made based on the technical idea of the present technology.

For example, the configurations, methods, steps, shapes, materials and values and the like given in the above-described embodiment and Examples are nothing more than examples, and a configuration, method, step, shape, material and value and the like different from the above may be used as needed. In addition, as the chemical formula of e.g. a compound, a typical one is described, and the described valence, for example, is not limited as long as the same compound general name is used.

In addition, the configurations, methods, steps, shapes, materials and values and the like in the above-described embodiment and Examples can be combined with each other without departing from the spirit of the present technology.

In addition, the present technology can adopt the following configurations.

(1)
A magnetic recording medium, which is used in a recording and playback device in which the shortest recording wavelength is 75 nm or less,
in which the magnetic recording medium has a recording layer including powder of ε-iron oxide-containing particles,
the average particle size of the particles is 22 nm or less,
the coercive force He is 220 kA/m or more and 320 kA/m or less, and
the non linear transition shift is 20% or less.
(2)
The magnetic recording medium according to (1), in which the particles have a core-shell structure.
(3)
The magnetic recording medium according to (1) or (2), in which the particles has:
a core unit including ε-iron oxide, and
a shell unit including a soft magnetic substance.
(4)
The magnetic recording medium according to (3), in which the shell unit has:
a first shell unit provided on the core unit, and
a second shell unit provided on the first shell unit,
the first shell unit includes α-Fe, NiFe alloy or FeSiAl alloy, and
the second shell unit includes α-iron oxide, aluminum oxide or silicon oxide.
(5)
The magnetic recording medium according to (1), in which the particles further include a metal other than iron.
(6)
The magnetic recording medium according to (5), in which the metal is at least one of aluminum, gallium or indium.
(7)
The magnetic recording medium according to any of (1) to (6), in which the average thickness of the recording layer is 30 nm or more and 120 nm or less.
(8)
The magnetic recording medium according to any of (1) to (7), in which the activation volume $V_{act}$ is 5000 nm$^3$ or less.
(9)
The magnetic recording medium according to any of (1) to (8), in which the squareness ratio of the magnetic recording medium measured in a moving direction is 30% or less.
(10)
The magnetic recording medium according to any of (1) to (9), in which the arithmetic average roughness Ra of the surface on the side of the recording layer is 2.5 nm or less.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

11 Base
12 Underlayer
13 Recording layer
14 Back coating layer
15 Enhancement layer
16 Cupping inhibiting layer
17 First enhancement layer
18 Second enhancement layer
19 Adhesion inhibiting layer
21 Core unit
22 Shell unit
22a First shell unit
22b Second shell unit

The invention claimed is:

1. A magnetic recording medium, which is used in a recording and playback device in which a shortest recording wavelength is 75 nm or less,
wherein the magnetic recording medium has a recording layer comprising powder of ε-iron oxide-containing particles,
wherein an average particle size of the particles is 22 nm or less,
wherein a coercive force Hc is 220 kA/m or more and 320 kA/m or less,
wherein a non linear transition shift is 20% or less,
wherein the ε-iron oxide-containing particles have a core-shell structure,
wherein an average thickness of the recording layer is 30 nm or more and 120 nm or less, and
wherein an arithmetic average roughness Ra of a surface on a side of the recording layer is 2.5 nm or less.

2. The magnetic recording medium according to claim 1, wherein the ε-iron oxide-containing particles include:
a core unit comprising ε-iron oxide, and
a shell unit comprising a soft magnetic substance.

3. The magnetic recording medium according to claim 2, wherein the shell unit has:
a first shell unit provided on the core unit, and
a second shell unit provided on the first shell unit,
the first shell unit comprises α-Fe, NiFe alloy or FeSiAl alloy, and
the second shell unit comprises α-iron oxide, aluminum oxide or silicon oxide.

4. The magnetic recording medium according to claim 1, wherein the ε-iron oxide-containing particles further comprise a metal other than iron.

5. The magnetic recording medium according to claim 4, wherein the metal is at least one of aluminum, gallium or indium.

6. The magnetic recording medium according to claim 1, wherein the average thickness of the recording layer is 40 nm or more and 120 nm or less.

7. The magnetic recording medium according to claim 1, wherein an activation volume $V_{act}$ is 5000 nm$^3$ or less.

8. The magnetic recording medium according to claim 1, wherein a squareness ratio of the magnetic recording medium measured in a moving direction is 30% or less.

9. The magnetic recording medium according to claim 1, wherein the coercive force Hc is 230 kA/m or more and 300 kA/m or less.

* * * * *